(12) United States Patent  
Horn

(10) Patent No.: US 7,327,440 B2
(45) Date of Patent: Feb. 5, 2008

(54) DISTANCE MEASURING DEVICE

(75) Inventor: James N Horn, Seattle, WA (US)

(73) Assignee: James N. Horn, Seattle, WA (US)

( * ) Notice: Subject to any disclaimer, the term of this patent is extended or adjusted under 35 U.S.C. 154(b) by 157 days.

(21) Appl. No.: 11/202,976

(22) Filed: Aug. 12, 2005

(65) Prior Publication Data

US 2006/0044545 A1    Mar. 2, 2006

Related U.S. Application Data

(60) Provisional application No. 60/601,777, filed on Aug. 16, 2004.

(51) Int. Cl.
*G01C 3/08*    (2006.01)

(52) U.S. Cl. .................... 356/4.03; 356/3.06; 356/4.06

(58) Field of Classification Search ................ 356/4.01
See application file for complete search history.

(56) References Cited

U.S. PATENT DOCUMENTS

| | | | |
|---|---|---|---|
| 3,617,128 A | 11/1971 | Harvey | 356/4 |
| 3,918,814 A | 11/1975 | Weiser | 356/156 |
| 4,514,084 A | 4/1985 | Makino et al. | 356/4 |
| 4,677,641 A | 6/1987 | Podgorski | 372/108 |
| 4,752,799 A * | 6/1988 | Stauffer | 396/109 |
| 5,151,608 A | 9/1992 | Torii et al. | 250/561 |
| 5,266,956 A | 11/1993 | Canal et al. | 342/128 |
| 5,282,014 A | 1/1994 | Ruhl, Jr. et al. | 356/5 |
| 5,293,213 A | 3/1994 | Klein et al. | 356/349 |
| 5,708,860 A * | 1/1998 | Nonaka et al. | 396/28 |
| 5,835,204 A | 11/1998 | Urbach | 356/5.01 |
| 5,915,233 A | 6/1999 | Nonaka | 702/158 |
| 5,929,980 A | 7/1999 | Yamaguchi et al. | 356/4.03 |
| 6,173,122 B1 | 1/2001 | Matsumoto et al. | 396/104 |
| 6,476,943 B1 | 11/2002 | Yertoprakhov | 359/15 |
| 6,480,265 B2 * | 11/2002 | Maimon et al. | 356/4.07 |
| 6,483,536 B2 | 11/2002 | Aoyama | 348/139 |
| 6,522,393 B2 * | 2/2003 | Higashino | 356/3.03 |

(Continued)

FOREIGN PATENT DOCUMENTS

| | | |
|---|---|---|
| EP | 0427692 | 5/1991 |
| EP | 0933094 | 8/1999 |

(Continued)

*Primary Examiner*—Thomas H. Tarcza
*Assistant Examiner*—Tim Brainard
(74) *Attorney, Agent, or Firm*—David L. Garrison; Merchant & Gould

(57) ABSTRACT

A distance measuring device is disclosed which can measure the distance to an object located within a known range. The device uses beam splitters and lenses to focus and direct energy reflected from an object onto at least two bi-sensors. The bi-sensors each have an inner sensing area and an outer sensing area. When the device has been properly calibrated, the reflected energy will be focused such that almost all of it will fall into the inner sensing area of one be-sensor when the object is at the minimum distance in the known range and when the object it at the maximum distance almost all of the energy will fall onto the inner sensing area of the other sensor. The distance to an object is calculated by comparing the ratio of the energy on the inner sensing areas of the two sensors with a table of known ratio verses distance values.

12 Claims, 7 Drawing Sheets

U.S. PATENT DOCUMENTS

| | | | |
|---|---|---|---|
| 6,549,277 B1 | 4/2003 | Narushima et al. | 356/218 |
| 6,683,675 B2 | 1/2004 | Aoyama | 356/3.03 |
| 6,765,683 B2 | 7/2004 | Ichihara | 356/521 |
| 6,782,118 B2 * | 8/2004 | Verga | 382/106 |
| 2002/0076132 A1 * | 6/2002 | Peral et al. | 385/15 |

FOREIGN PATENT DOCUMENTS

| | | |
|---|---|---|
| EP | 1298480 | 7/2001 |
| JP | 10-047938 | 2/1998 |
| WO | WO 88/07657 | 10/1988 |

\* cited by examiner

DISTANCE MEASURING DEVICE

This application claim the benefit of U.S. Provisional Patent Application Ser. No. 60/601,777 entitled DISTANCE MEASURING DEVICE, filed Aug. 16, 2004.

TECHNICAL FIELD

The present invention relates to a distance measuring device and, more particularly, to a device for measuring distance over a predetermined range using at least two focused sensors.

BACKGROUND OF THE INVENTION

There are many uses for lasers that can benefit society, including a wide range of remote sensing applications. One such use can be to measure distance and variety of methods for measuring distances with lasers are known to exist. Examples of these methods include interferometry, laser Doppler displacement, beam modulation telemetry, and pulse time of light.

Laser interferometers typically provide measurement of displacement from a starting position rather than a measurement of position. The instrument reading is typically set to zero as the initial position of the moving part, and the motion is then measured relative to this zero position. Laser interferometry or distance measurement must be used in a controlled environment. Accordingly this method is typically used in manufacturing applications such as checking the location of work holding fixtures, checking the motion of machining tools, and similar applications.

Laser Doppler displacement distance measurement takes advantage of the Doppler shift of laser frequency effected when a stabilized laser is reflected from a moving surface. This frequency shift can be measured and converted to a measurement of surface displacement, i.e., the difference between a start position and position of an object.

Neither interferometric nor Doppler displacement methods can be used to measure large distances in uncontrolled environments. In particular, fluctuations of the density of the atmosphere over paths exceeding a few hundred feet make these methods impractical.

A common method of distance measurement used outdoors over long distances involves amplitude modulation of a laser beam and projection of the modulated beam toward a target. Distance is measured by comparing the phase of the modulated amplitude of returning light with the phase of the modulated amplitude of emitted light.

Pulse laser range finders are also commonly used to determine large distances. Commercial applications include generation of terrain maps, calibration of aircraft radar, and measurements of ranges of aircraft and ground vehicles. Pulse laser range finders emit a short pulse of laser light and measure the transit time for the pulse to reach a visible target, and for the reflected pulse to return to a receiver located near the laser.

These and other methods for measuring distances are common in the art and they provide many benefits to society. While such devices are well known they do not teach or disclose the device and method that is the subject of the current application and is disclosed below.

SUMMARY OF THE INVENTION

Disclosed herein is a device for measuring distance over a predetermined range using more than one focused sensor. The device measures the distance to a laser generated spot (or other energy source) by comparing the reflected energy levels collected from more than one calibrated sensor. On preferred embodiment of the device uses two bi-sensors for a total of four sensors. Each light sensitive bi-sensor is composed of two parts—the light sensitive inner area of the sensor and the light sensitive outer area of the sensor.

To operate the device, a laser spot is projected onto an object that is some distance away from the device. The reflected laser energy is focused and then split to impinge onto two different bi-sensors, A and B. The device is calibrated to measure distances when and object is between distance 'A' and distance 'B'.

The sensors are positioned such that if the object is at distance 'A' away from the device, essentially all of the energy on sensor A is captured by the light sensitive inner area of sensor A and essentially none of the energy is captured by the light sensitive outer area of sensor A. When the object is at distance 'B' away from the device, essentially all of the energy on sensor B is captured by the light sensitive inner area of sensor B and essentially none of the energy is captured by the light sensitive outer area of sensor B.

When the device is used to measure the distance of an object the laser or other energy source is projected onto the object and the reflected energy is focused and then split to impinge onto the two sensors. The level of energy is determined for the inner area and outer area of each sensor. Whether the object is in the range of A to B, and the distance of the object from the device are determined by comparing the ratios of the energy levels from the inner and outer levels on the sensors.

BRIEF DESCRIPTION OF THE DRAWINGS

The objects and features of the present invention, which are believed to be novel, are set forth in the appended claims. The present invention, both as to its organization and manner of operation, together with further objects and advantages, may best be understood by reference to the following descriptions, taken in conjunction with the accompanying drawings, wherein:

DETAILED DESCRIPTION OF THE INVENTION

Figure 1:
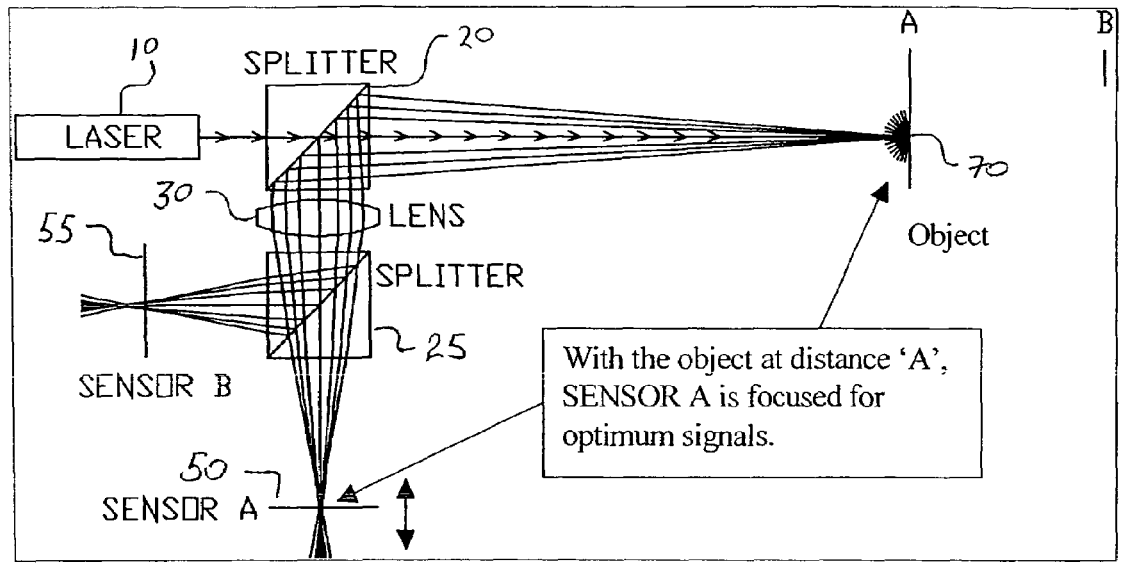
FIG. 1 shows an embodiment of the device disclosed herein with a laser focused on an object that is distance 'A' away from the device.

Turning now to the drawings, the forms and accessories will be described in preferred embodiments by reference to the numerals of the drawing figures wherein like numbers indicate like parts.

Figure 2:
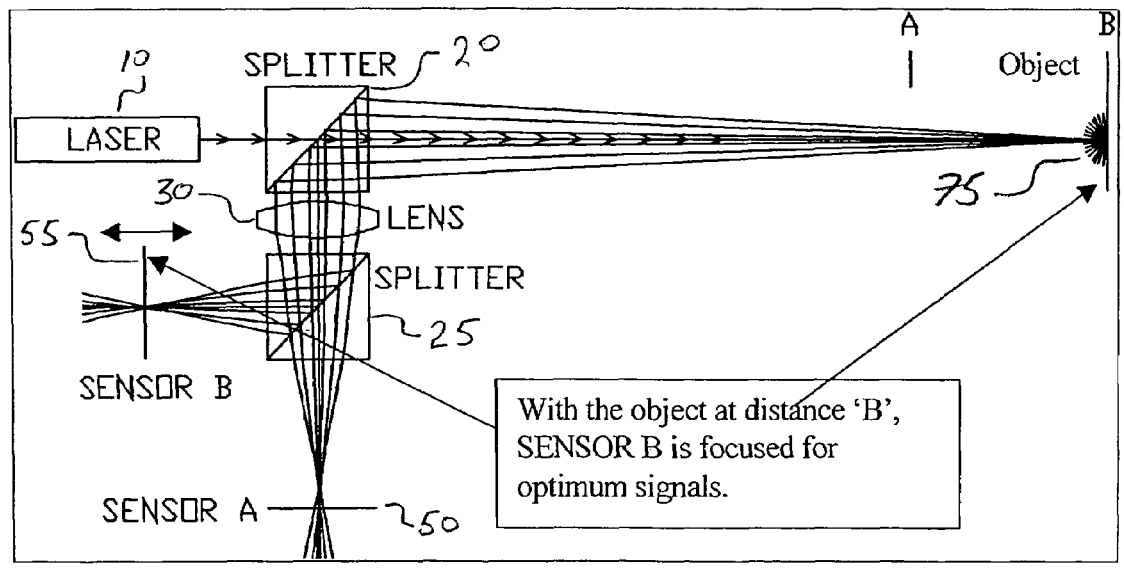
FIG. 2 shows an embodiment of the device disclosed herein with a laser focused on an object that is distance 'B' away from the device.
Figure 3:
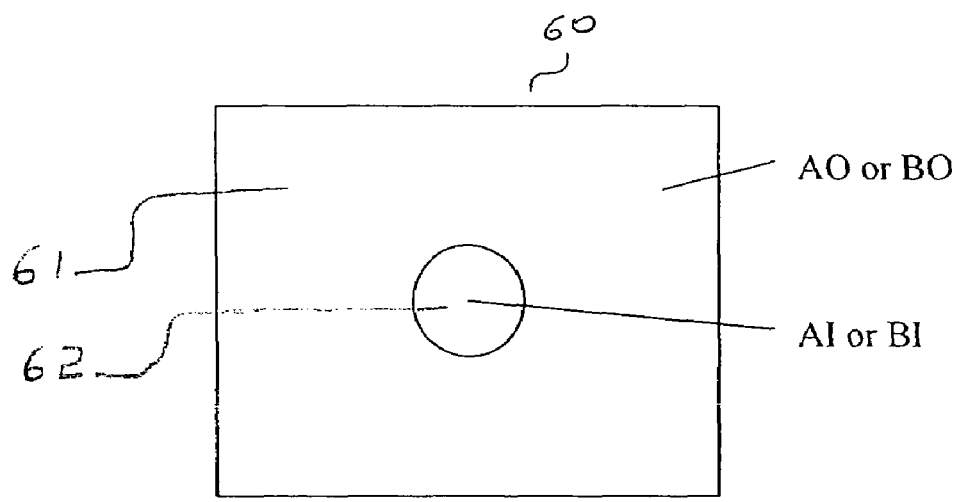
FIG. 3 shows the sensing surface configuration for one type of sensor that can be used on the device that is disclosed herein.

Referring to FIG. 1 through FIG. 3, there can be seen one embodiment of a device used to measure distance over a known range. Referring to FIGS. 1 and 2, the device in its simplest form is comprised of a laser 10 or some other energy source that emits a beam of light (shown herein as a solid line with arrowheads) through a first beam splitter 20 along a straight line at an object. The light from the beam is reflected off of the object (shown herein as a plurality of solid black lines with no arrowheads) and back to the first splitter 20, which directs the light through a lens 30 and onto a second beam splitter 25. The second beam splitter 25 then splits the light into two beams and directs the beams onto a pair of photo sensitive bi-sensors 50 & 55 shown as sensor A and sensor B.

Although several types of beam splitters are suitable for use with the device disclosed herein, the embodiment depicted has a standard cube beam splitter. The cube beam splitter is composed of two optical ninety-degree prisms that are adhered together forming the cube. One of the diagonal surfaces is first coated with a reflective material before the cube is constructed. That material will reflect a certain percentage of energy (90° path) and let pass (transmission) a certain percentage of energy (straight path). For the application disclosed herein, the ideal reflection and transmission percentages are both % 50. In other words, % 50 of the energy is reflected and % 50 of the energy passes straight through the splitter.

For the splitters 20 & 25 depicted in FIG. 1 and FIG. 2 we see energy in the form of the laser beam being directed through the first splitter 20 toward the object. In practice, 50% of the laser energy would be directed upward and out of the splitter (not shown for simplicity because the energy is not used). Additionally, % 50 of the reflected energy would pass straight through the splitter and back to the laser (again not shown because the energy is not used). The second beam splitter 25 represents a complete picture of the beam splitter function.

The reason the first splitter is used, in the embodiment depicted in FIGS. 1 and 2, is to make the laser emission path and the return energy path correspond with each other. This keeps the focused spot centered on the sensors while the object moves. This may not be the case with other embodiments of the device disclosed herein.

Referring to FIG. 3, the surface of each bi-sensor 60 is configured such that the surface of the sensor is divided into two separate areas. These areas are an outer sensing area 61 and an inner sensing area 62. The outer sensing area 61 measures the energy or light that is striking the sensor on such area and this energy is referred to herein as AO or BO to indicate the energy on the outer sensing areas of sensor A 50 and sensor B 55 respectively. The inner sensing area 62 measures the energy or light that is striking the sensor on such area and this energy is referred to herein as AI or BI to indicate the energy on the inner sensing areas of sensor A 50 and sensor B 55 respectively.

Referring to FIG. 1 and FIG. 2, the sensors are positioned and the lens is shaped such that when light is emitted from the laser 10 and onto an object 70 that is at distance 'A' away from the device, an optimum signal is delivered to sensor A 50. In the case of the distance measuring device disclosed herein an optimum signal is defined as having nearly all of the reflected energy focused on the inner sensing area of a bi-sensor. Similarly, an optimum signal is delivered to sensor B 55 when light is emitted from the laser 10 and onto an object 75 that is at distance 'B' away from the device.

It can be seen from the figures, that the beam is focused to a spot that hits the sensor mostly on the inner sensing area when the signal for either sensor is optimum for a sensor. When the signal for a sensor is less than optimum, the beam diameter as it hits the sensor is larger than the inner sensing area.

For convenience, the following terms are defined (as partially noted above):
1. AI—the energy level from the inner circle area of sensor A.
2. AO—the energy level from the area outside the circle of sensor A.
3. AE—the total energy level from sensor A (AI+AO).
4. BI—the energy level from the inner circle area of sensor B.
5. BO—the energy level from the area outside the circle of sensor B.
6. BE—the total energy level from sensor B (BI+BO).

Thus, the device is calibrated to measure distances when the object is between the distance 'A' and the distance 'B'. The sensors are positioned such that sensor AI 50 will capture nearly all of AE with an object at the distance 'A' 70, and sensor BI will capture nearly all of BE when an object is at the distance 'B'.

Referring to FIG. 3, in an ideal condition, the size of the inner sensing area 62 will be the same size as the focused energy spot for the optimum condition for that particular sensor. However, sensors having larger or smaller inner sensing areas can be used. For such sensors, the optimum condition may result in the focused energy spot being either larger or smaller than the inner sensing area.

Figure 4:
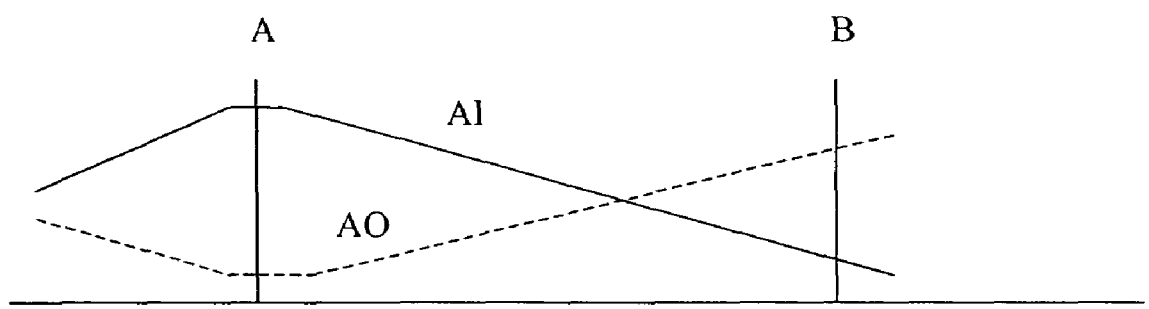
FIG. 4 is a graph showing the changes in the levels of energy measured by sensor 'A' of one embodiment of the device disclosed herein as the sensor measures the energy reflected from an object that has had a laser focused on it.
Figure 5:
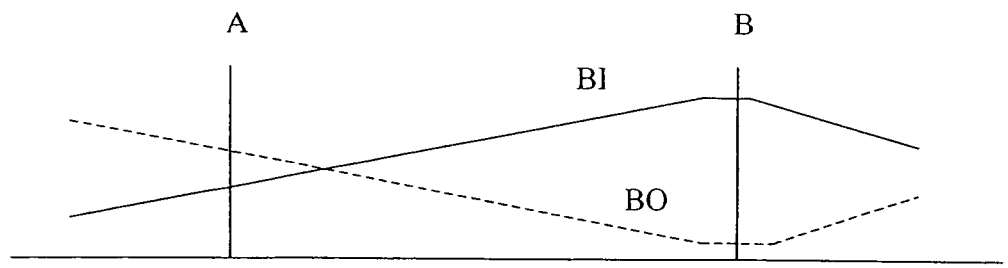
FIG. 5 is a graph showing the changes in the levels of energy measured by sensor 'B' of one embodiment of the device disclosed herein as the sensor measures the energy reflected from an object that has had a laser focused on it.

Referring to FIG. 4 and FIG. 5, there are shown graphs of the changes of the levels of reflected energy for AO, AI, BO, and BI (after the device has been calibrated) as an object is moved over a distance of less than 'A' to greater than 'B'. As can be seen in FIG. 4, where AI is calibrated to be optimum when an object is at a minimum distance 'A' from the device; as the object is moved away from the device AI decreases and AO increases. Conversely, FIG. 5 shows that for the same device where BI is calibrated to be optimum when an object is at a maximum distance 'B' from the device; as the object is moved away from the device BI increases and BO decreases.

From these graphs, one can see that the ratio of AI to BI is unique for all distances between 'A' and 'B'. Thus during the second phase of calibration an object is moved over the range of distance slightly before 'A' to slightly after 'B' and the various energy levels are measured over this ranges to create a table of ratio verses distance for AI to BI and other energy levels. During operation of the device the ratio of AI to BI is used to determine the distance of an object from the device by reference to the table and interpolation if necessary.

Distances closer than 'A' or farther than 'B' are invalid. The invalid conditions are determined by evaluating all four energy levels. If AI is greater than BI, then there is a ratio of BI to BO that will establish if an object is closer to the device than the minimum distance 'A'. If BI is greater than AI, then there is a ratio of AI to AO that will establish if an object is farther from the device than the maximum distance 'B'. As with the table of ratio verses distance for AI to BI, the values of the ratios of BI to BO and AI to AO for invalid conditions are also recorded in a table for reference during operation of the device. If the object cannot exist outside of the measurement range, then AO and BO are not required and only two energy levels (AI and BI) would be needed.

Figure 6:
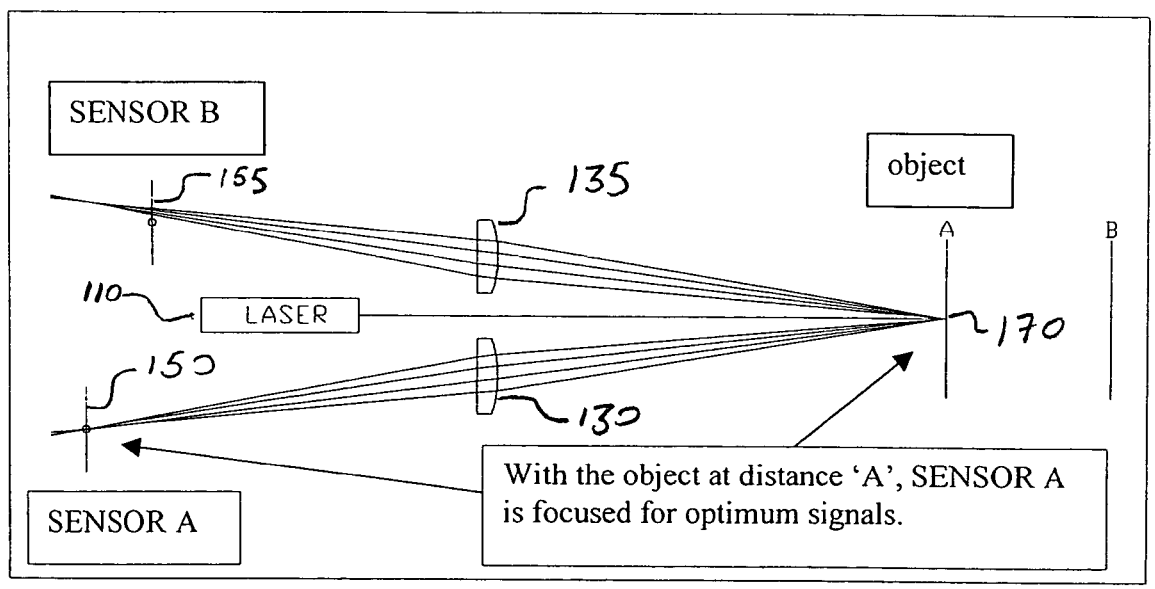
FIG. 6 shows another preferred embodiment of the device disclosed herein with a laser focused on an object that is distance 'A' away from the device.
Figure 7:
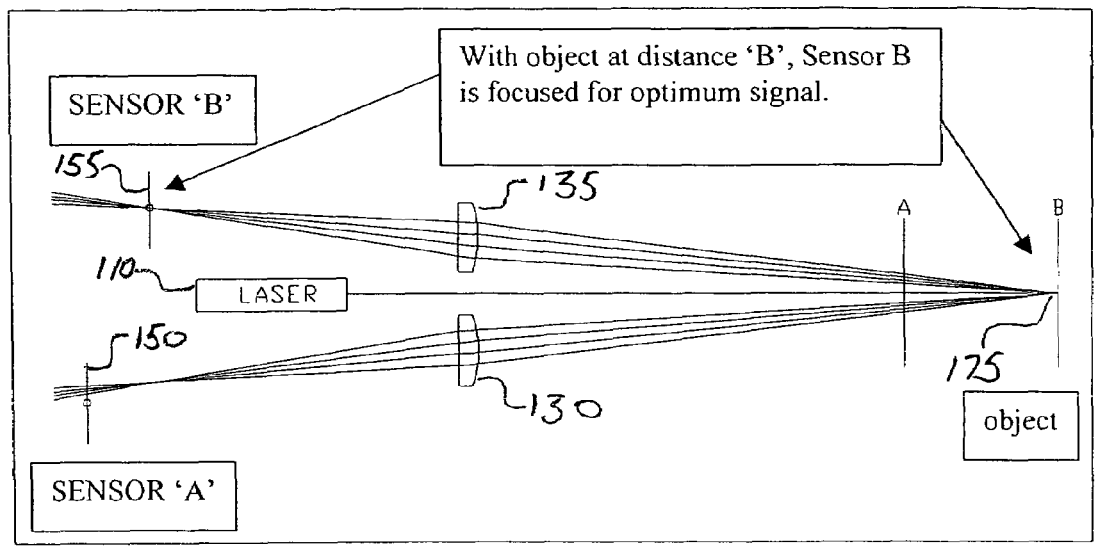
FIG. 7 shows another preferred embodiment of the device disclosed herein with a laser focused on an object that is distance 'B' away from the device.

Referring to FIG. 6 and FIG. 7, there is shown another embodiment of the device disclosed herein. In the embodiment depicted, energy is emitted from a laser 110 and is reflected off of an object back towards the device. The energy is then focused by a pair of lenses 130 & 135 onto a pair of bi-sensors 150 & 155. As with the example above, the lenses 130 & 135 of this embodiment are shaped such and the bi-sensors 150 & 155 are positioned such that the device can be calibrated so that when light is emitted from the laser 110 and onto an object 170 that is at distance 'A' away from the device, an optimum signal is delivered to sensor A 150. Similarly, an optimum signal is delivered to sensor B 155 when light is emitted from the laser 110 and onto an object 175 that is at distance 'B' away from the device.

In the embodiment depicted, the energy returned to tot two bi-sensors A 150 and B 155 does not come through the same entry point on the device. Each lens receives energy from a slightly different angle. This arrangement uses fewer parts and is therefore relatively cheaper to make. However, it is also possible to block energy from one lens (example dirty lens). This would cause an error if the ratio of AI to BI were used directly to determine the distance. To compensate for the error, the ratio of % AI to % BI would be used to calibrate the device and to lookup distance. For such calculations, the following definitions apply: % AI=$100(^{AI}/_{AE})$; and % BI=$100(^{BI}/_{BE})$. Essentially, the sensors are normalized before using the signals.

Figure 8:
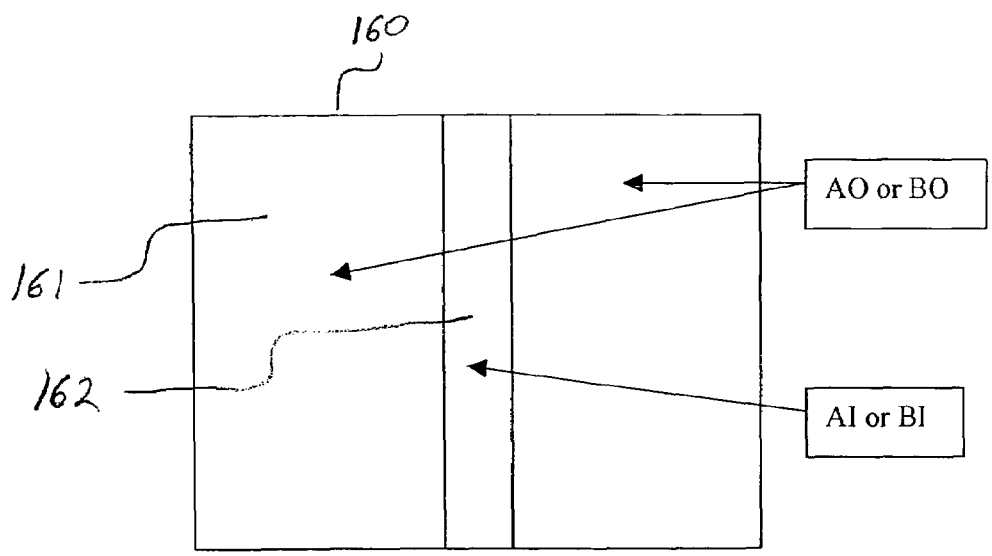
FIG. 8 shows the sensing surface configuration for another type of sensor that can be used on the device that is disclosed herein.
Figure 9:
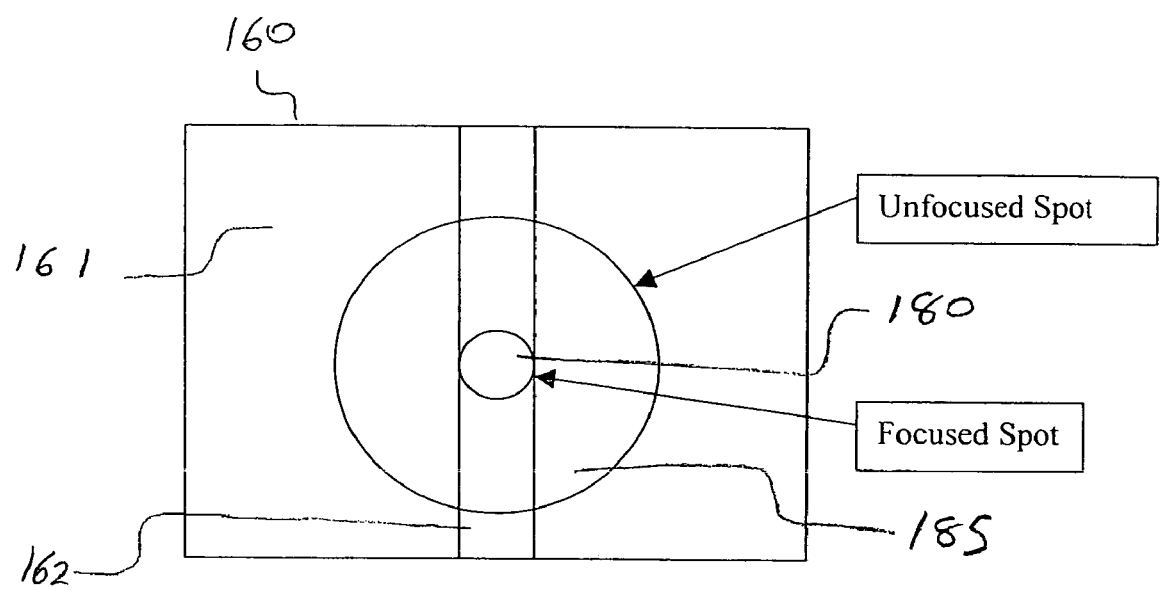
FIG. 9 shows the sensing surface configuration for yet another type of sensor that can be used on the device that is disclosed herein.

FIG. 8 and FIG. 9 depict an additional embodiment of bi-sensor that can be used on the device disclosed herein. For the embodiment depicted, the inner sensing area 162 is a narrow strip that transects the surface of the bi-sensor 160. The outer sensing area 161 occupies both sides of the strip 162. When using this type of bi-sensor, the device is calibrated such that nearly all of the energy will be focused on the narrow strip shaped inner sensing area when an object is at the position wherein the reflected light for a particular bi-sensor is optimally focused.

Referring to FIG. 9, when an object is at an optimum position for a bi-sensor the reflected energy is focused into a spot 185 such that it mostly falls on the inner sensing area 162 thus the % AI or % BI would be larger. As the spot gets out of focus or grows larger 185 the percentage gets smaller.

If this type of bi-sensor is used for the embodiment of the device that is shown in FIGS. 6 & 7, the focused and unfocused spots are not concentric on the bi-sensors. The spot moves up on Sensor B and down on sensor A as the object gets closer to the device. If this movement is significant the strip bi-sensor would be a better choice for use because the energy spot would quickly move away from the center on the type of bi-sensor depicted in FIG. 3, as the object moved away from the calibration position.

Figure 11:
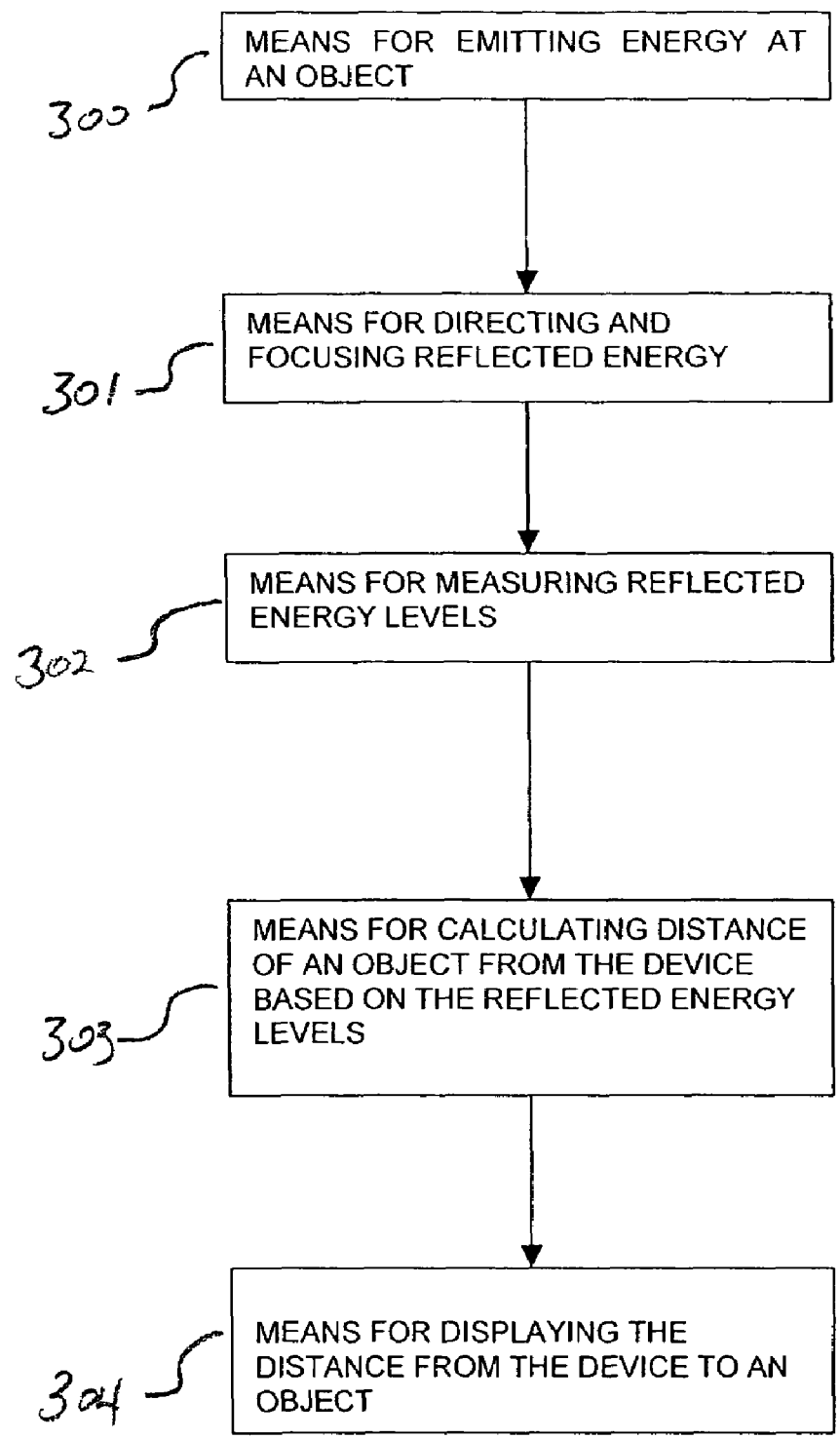
FIG. 11 is a block diagram showing the device disclosed herein broken down into the base components needed to measure the distance from the device to an object as disclosed herein.

FIG. 11 shows a device for measuring distance over a known range as disclosed herein. In a simple form, the device requires some means for emitting energy at an object 300 (shown herein as a laser) that is some distance away from the device. The means for emitting energy at an object can also include means for activating the device such as an on off switch or some type of actuator.

The device also requires a means for directing and focusing the reflected energy 301, and such means are shown herein as beam splitters and lenses. A means for measuring the reflected energy levels 302 is depicted herein as a pair of bi-sensors each having its surface divided into an inner sensing area and an outer sensing area.

The means for calculating the distance of an object from the device based on the reflected energy levels 303 can be a programmable micro-processor into which a table of the ratio verses distance can be programmed as well as the values of ratios for invalid distances as described above. The microprocessor can be programmed to receive input from the bi-sensors and to determine the ratios of the various energy levels before comparing the ratios to known values to determine the distance from the device to an object. The microprocessor can then send the information to a higher level computer or display the distance for an end user. The means for displaying the distance from the device to an object 304 can be a digital display device that will display the distance based on instructions from the microprocessor.

Figure 10:
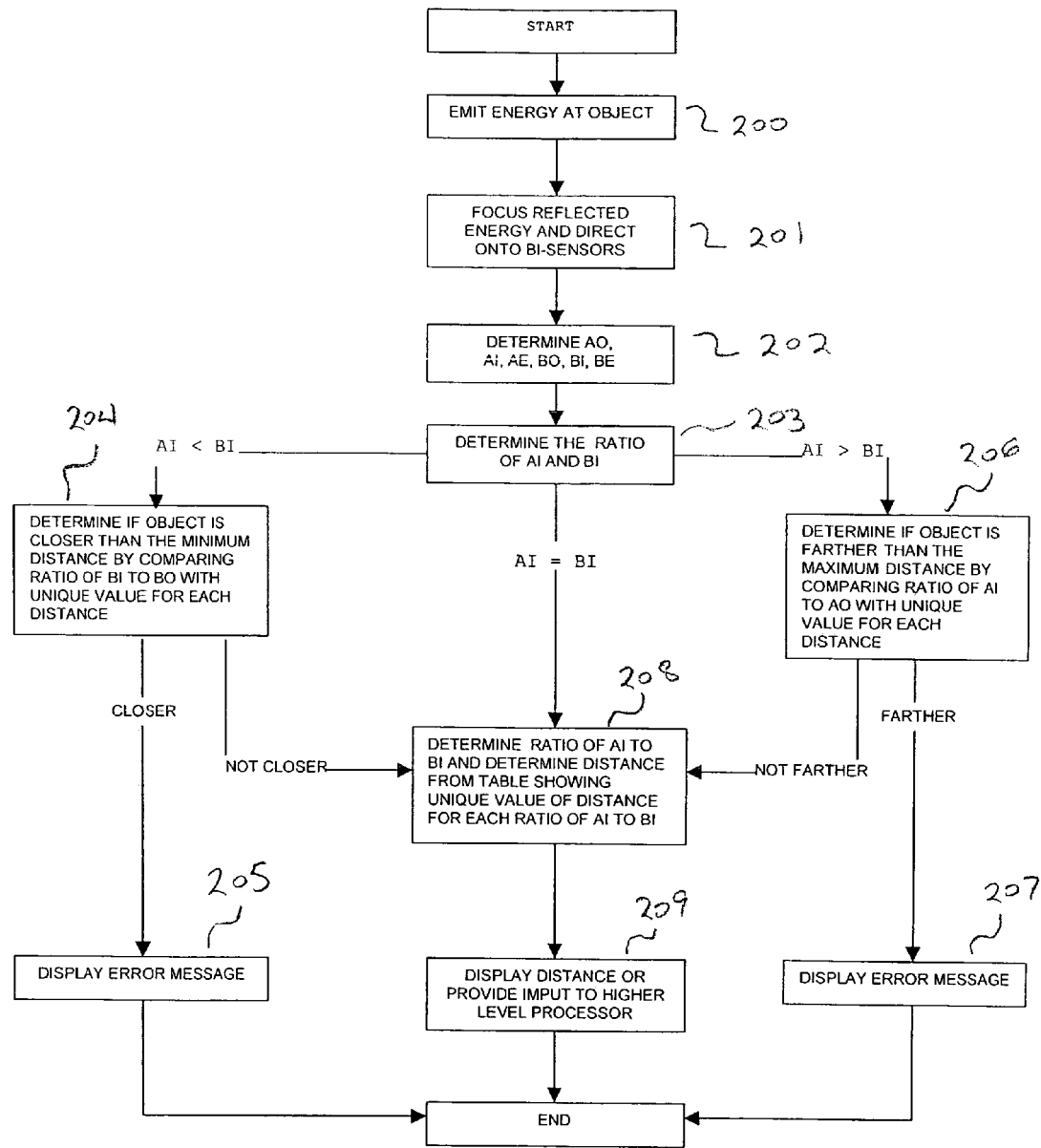
FIG. 10 is a block diagram showing the steps of the method of measuring the distance to an object using the device disclosed herein.

Referring to FIG. 10, one can see the steps involved in determining the distance to an object in a known range using a calibrated device as disclosed herein. To determine the distance to an object within a known range of distances, energy is emitted at the object 200 usually from a laser. The energy that is reflected off of the object is then focused and directed onto a pair of bi-sensors 201.

The surface area of each bi-sensor is divided into an inner sensing area and an outer sensing area thereby allowing the energy level for each sensing area and the total energy for each sensor to be calculated by a micro processor based on input or signals from the sensors. After the energy levels have been calculated, the ratio of AI to BI is determined and AI and BI are compared 203.

If AI is greater than BI, the ratio of BI to BO is examined to determine if the object is closer than the minimum distance from the device 204. If the object is closer than the minimum distance, a message is sent/displayed to indicate that the object is too close to the device for measurement 205.

If BI is greater than AI, the ratio of AI to AO is examined to determine if the object is further than the maximum distance from the device 206. If the object is farther than the maximum distance, a message is sent/displayed to indicate that the object is too far from the device for measurement 207.

If the object is within the accepted range for distance measurement, the ratio of AI to BI is determined and the distance to the object is determined by comparing the ratio to a ratio verses distance table and extrapolating if necessary 208. After the distance has been determined, it is displayed or the information is sent to a higher level processor 209.

The embodiments of the device described above can be calibrated such that the minimum distance "A" can be very small (fractions of an inch) and "B" can be relatively large (ten miles). One preferred embodiment contemplates a minimum distance of six inches and a maximum distance of fifty feet.

Among the many potential applications for the device disclosed herein are a board scanner and a log scanner. For a log scanner, the range could be from six feet to twelve feet and in the board scanner the range could be from five inches to twenty inches. In both cases, a plurality of devices could be used simultaneously to provide input to a higher level processor for measuring the 3-dimensional shape of the board or log. In one such application, one-hundred or more distance measuring devices could provide input rapidly (over 1000 times per second) as the board or log passes within the range of the devices.

Other embodiments of the devices disclosed herein can be constructed using more than two sensors. In some cases additional sensors could be useful in improving the accuracy, extending the range, use as backup sensors, or providing a diagnostic signal to validate other sensors.

INDUSTRIAL APPLICABILITY

The invention has applicability in the field of devices used to measure distances over a known range. In particular the current invention describes a device using focused reflected energy to determine the distance to an object. This device has applicability in land surveying methods, construction, accident investigation, or any other application where it is important to know the distance between one point and an object at another point. In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

What is claimed is:

1. A device for measuring distance over a known range comprising:
    a laser, a first beam splitter, a lens, a second beam splitter, a first sensor, and a second sensor;
    the laser being configured to emit energy at an object;
    the first splitter being configured to direct emitted energy along a straight line away from the device, and to direct energy, reflected from the object, toward the lens;
    the lens configured to focus the reflected energy onto the second splitter;
    the second splitter configured to split the focused energy into a number of beams that corresponds to the number of sensors;
    each of the sensors having a photo sensitive surface that is divided into at least two sensing areas such that the surface has an inner sensing area and an outer sensing area; and
    the lens being shaped and the sensors being positioned such that when the object is at the minimum distance of the known range, almost all of the energy focused on the first sensor will be focused on the inner sensing area, and when the object is at the maximum distance of the known range almost all of the energy focused on the second sensor will be focused on the inner sensing area.

2. The device of claim 1 wherein the ratio of the energy level measured by the inner sensing area of the first sensor and the energy level measured by the inner sensing area of the second sensor is unique for all distances over the known range, and the distance to the object is determined by determining the ratio.

3. The device of claim 2 further comprising means for determining the ratio of the energy level measured by the inner sensing area of the first sensor and the energy level measured by the inner sensing area of the second sensor and determining the distance to the object based on the ratio.

4. The device of claim 3 wherein the means for determining the ratio of the energy level measured by the inner sensing area of the first sensor and the energy level measured by the inner sensing area of the second sensor and determining the distance to the object based on the ratio is a micro processor that has a table of the distance for each value of the ratio stored therein and the sensors are further configured to provide input to the micro processor; and
    the microprocessor is programmed to receive input from the sensors, determine the ratio, compare the ratio to the table to determine the distance to the object and transmit the determined distance.

5. The device of claim 4 further comprising means for displaying the distance from the device to the object and wherein the microprocessor provides input to said means such that the distance to the object is displayed.

6. The device of claim 1 further comprising means for causing the device to emit energy at an object.

7. A device for measuring distance over a known range comprising:
    a laser, a first lens, a second lens, a first sensor, and a second sensor;
    the laser being configured to emit energy at an object along a straight line away from the device;
    the first lens being configured to focus the energy, reflected from the object, onto the first sensor;
    the second lens being configured to focus the energy, reflected from the object, onto the second sensor;
    each of the sensors having a photo sensitive surface that is divided into at least two sensing area such that the surface has an inner sensing area and an outer sensing area;
    the first lens being shaped and the first sensor being positioned such that when the object is at the minimum distance of the known range, almost all of the energy focused on the first sensor will be focused on the inner sensing area;
    the second lens being shaped and the second sensor being positioned such that when the object is at the maximum distance of the known range, almost all of the energy focused on the second sensor will be focused on the inner sensing area.

8. The device of claim 7 wherein the ratio of the energy level measured by the inner sensing area of the first sensor and the energy level measured by the inner sensing area of the second sensor is unique for all distances over the known range, and the distance to the object is determined by determining the ratio.

9. The device of claim 8 further comprising means for determining the ratio of the energy level measured by the inner sensing area of the first sensor and the energy level measured by the inner sensing area of the second sensor and determining the distance to the object based on the ratio.

10. The device of claim 9 wherein the means for determining the ratio of the energy level measured by the inner sensing area of the first sensor and the energy level measured by the inner sensing area of the second sensor and determining the distance to the object based on the ratio is a micro processor that has a table of the distance for each value of the ratio stored therein and the sensors are further configured to provide input to the micro processor; and the microprocessor is programmed to receive input from the sensors, determine the ratio, and compare the ratio to the table to determine the distance to the object.

11. The device of claim 10 further comprising means for displaying the distance from the device to the object and wherein the microprocessor is programmed to provide input to said means such that the distance to the object is displayed.

12. The device of claim 10 wherein the microprocessor is programmed to provide the distance to the object as an input signal to a higher level processor.

* * * * *